(12) United States Patent
Zhang et al.

(10) Patent No.: US 9,221,178 B2
(45) Date of Patent: Dec. 29, 2015

(54) LIVE WORKING ROBOT FOR REPLACING INSULATOR STRING

(71) Applicants: SHANXI ELECTRIC POWER COMPANY TAIYUAN POWER SUPPLY COMPANY, Taiyuan, Shanxi (CN); STATE GRID CORPORATION OF CHINA, Beijing (CN); SHANXI GREAT WALL ELECTRICAL AND MECHANICAL RESEARCH INSTITUTE, Taiyuan, Shanxi (CN)

(72) Inventors: Junliu Zhang, Shanxi (CN); Zhiyong Chen, Shanxi (CN); Nianjun Zhang, Shanxi (CN); Zongze Huang, Shanxi (CN); Jinping Wang, Shanxi (CN); Xingyu Ma, Shanxi (CN)

(73) Assignees: SHANXI ELECTRIC POWER COMPANY TAIYUAN POWER SUPPLY COMPANY, Taiyuan, Shanxi (CN); STATE GRID CORPORATION OF CHINA, Beijing (CN); SHANXI GREAT WALL ELECTRICAL AND MECHANICAL RESEARCH INSTITUTE, Taiyuan, Shanxi (CN)

( * ) Notice: Subject to any disclaimer, the term of this patent is extended or adjusted under 35 U.S.C. 154(b) by 0 days.

(21) Appl. No.: 14/130,232

(22) PCT Filed: Nov. 5, 2012

(86) PCT No.: PCT/CN2012/001488
§ 371 (c)(1),
(2) Date: Dec. 30, 2013

(87) PCT Pub. No.: WO2014/012196
PCT Pub. Date: Jan. 23, 2014

(65) Prior Publication Data
US 2015/0113798 A1    Apr. 30, 2015

(30) Foreign Application Priority Data

Jul. 16, 2012    (CN) .......................... 2012 1 0254457

(51) Int. Cl.
*H03G 1/02* (2006.01)
*B25J 13/02* (2006.01)
*H02G 1/02* (2006.01)
*B25B 7/00* (2006.01)
*B25B 7/18* (2006.01)
*B25J 1/12* (2006.01)
(Continued)

(52) U.S. Cl.
CPC .. *B25J 13/02* (2013.01); *B23P 6/00* (2013.01); *B25B 7/00* (2013.01); *B25B 7/18* (2013.01); *B25J 1/12* (2013.01); *B25J 15/0028* (2013.01); *H02G 1/02* (2013.01); *Y10T 29/5313* (2015.01)

(58) Field of Classification Search
CPC ............. H02G 1/03; H02G 7/00; H02G 1/02; B25B 7/00; B25B 7/18; B25J 1/12; B25J 13/02; B23P 6/00
See application file for complete search history.

(56) References Cited

U.S. PATENT DOCUMENTS 4,396,344 A * 8/1983 Sugimoto ................ B25J 9/046
414/706

(Continued)

FOREIGN PATENT DOCUMENTS

JP    3597923    * 12/2004

*Primary Examiner* — Carl Arbes
(74) *Attorney, Agent, or Firm* — Knobbe, Martens, Olson & Bear LLP

(57) ABSTRACT

A live working robot for replacing insulator string comprises four parts including a locating mechanism, a clamping mechanism, a transmission mechanism and working condition indicating lamps. The robot is supported to operate in a horizontal plane by an insulating pole. The robot is hung in a vertical plane to support operation by an insulating rope. The locating mechanism can grip a socket accurately, which can be indicated in place by a horizontally positioned lamp and a vertically positioned lamp. The clamping mechanism can clamp a W-pin for disassembling and assembling. The transmission mechanism can transmit the clamping mechanism to clamp, release, advance and retreat the clamp. Placement and clamping of the clamp can be indicated with a clamping position lamp and a limiting lamp. The live working robot can replace the insulator string without the need of power cut, is in simple structure, works reliably and accurately and is time and labor saving. The living working robot is used for maintenance of high voltage lines.

5 Claims, 2 Drawing Sheets

(51) Int. Cl.
  *B23P 6/00* (2006.01)
  *B25J 15/00* (2006.01)

(56) References Cited

U.S. PATENT DOCUMENTS 4,973,215 A * 11/1990 Karlen ................ B25J 9/04
                                          414/729

6,230,580 B1 * 5/2001 Iwai .................... B25J 9/102
                                          414/680
7,622,001 B2 * 11/2009 Inada ............... B25J 19/0029
                                          118/300
8,631,720 B2 * 1/2014 Nakagiri ........... B25J 19/0029
                                          74/490.02

* cited by examiner

LIVE WORKING ROBOT FOR REPLACING INSULATOR STRING

BACKGROUND

1. Field

The invention belongs to power transmission and distribution engineering, and particularly relates to a robot for replacing an insulator on a power transmission line.

2. Description of the Related Art

Power transmission lines using insulator strings are all high voltage lines, in which the higher the voltage is, the bigger a power supply area is and the more it is hoped not to get into power cut to maintain the lines. It is a key technology to be solved for high-voltage power transmission to have electrified replacement of an insulator string. A lock taking device of current W-pin is mounted on an insulating pole of several meters long and is operated by an electrician holding a cantilever by hands. To insert such clamp-type lock taking device in a direction transverse to the sight into a socket under an insulator string iron pin, as area of projection in the clamping direction of the W-pin is only 8 mm×9 mm, and there lacks an alignment mechanism, the W-pin cannot be taken out successfully until several attempts have been made, which is time and labor consuming.

SUMMARY

A live working robot for replacing an insulator string uses a locating mechanism to align a fixed jaw 6 and a movable jaw 16 accurately with a W-pin B and uses a transmission mechanism to translate the fixed jaw 6 and the movable jaw 16 reliably and to clamp the W-pin B reliably, so as to disassemble and assemble the W-pin B accurately and reliable at a time. A robot is screwed at an end of an insulating pole 26 by a thread handle 28, hangs the insulating pole 26 by an inverted chain C to hang it over a ground wire cross arm. Two electricians can be used to operate jointly: positioning electrician controls the inverted chain C and lifts the insulating pole 26 to align a socket clip 2 of the robot with a neck of a socket A; assembling and disassembling electrician controls a clamp 5 of the robot for assembly and disassembly of the W-pin B.

The live working robot for replacing an insulator string comprises four parts including a locating mechanism, a clamping mechanism, a transmission mechanism and working condition indicating lamps.

The locating mechanism: The socket clip 2 is provided at one end of a holder 1. The socket clip 2 which is in U shape with an opening end in a shape of a Chinese character "八" can guide the robot to a working position. A bottom of the U shape is provided with a horizontally positioned lamp 31, and one side of the U shape is provided with a vertically positioned lamp 3. When the robot is at the working position, an inner surface of the socket clip 2 is in well engagement with the socket A to turn on switches 32 of the horizontally positioned lamp 31 and the vertically positioned lamp 3 in sequence to light both of them up, to show the working conditions in place.

A clamping mechanism: The clamp 5 is fixed at the other end of the holder 1. The clamp 5 comprises one half clamp body formed by the fixed jaw 6 and a fixed clamp handle 15 integrated into one piece and the other half clamp body formed by a movable jaw 16 and a movable clamp handle 10 integrated into one piece which are hinged by a clamp shaft 7. An end of the movable clamp handle 10 is provided with a rope ring 11 on which a release-tension rope 21 is tied. The middle part of the movable clamp handle 10 is formed with a hole through which a position regulating bolt 8 passes to regulate space between the fixed jaw 6 and the movable jaw 16 to be adapted to a clamping width of the W-pin. The movable clamp handle 10 is further provided with a limit screw 9 for defining a closing space between the fixed jaw 6 and the movable jaw 16. An end of the fixed clamp handle 15 is provided with a handle shaft 13 and the middle part of the fixed clamp handle 15 is in hinge connection with the position regulating bolt 8. A limit pressure spring 12 is sleeved outside the position regulating bolt 8 between the fixed clamp handle 15 and the movable clamp handle 10 and working position of the movable jaw 16 is defined by the movable clamp handle 10. The end of the fixed clamp handle 15 is provided with a limiting lamp 14.

The holder 1 comprises a thread handle 28 in the middle part thereof. The holder 1 comprises side plates 4 at both an upper side and a lower side thereof. Each of the two side plates 4 has two sliding rails 29 parallel to each other, two of which support both ends of the clamp shaft 7 and the other two support both ends of the handle shaft 13. The four sliding rails 29 are parallel to a bottom surface of the holder 1, with the length from start to end enabling the fixed jaw 6 and the movable jaw 16 to enter the socket A to clamp the W-pin B just right and to withdraw from the socket A and leave an appropriate space E therebetween after their withdrawal.

The transmission mechanism: A hand holding end of the insulating pole 26 is provided with two wheel seats 25, the outside one of which is provided with a tightener 24 which is connected to the release-tension rope 21, so as to pull the movable clamp handle 10 to clamp the W-pin B. The elastic force of the limit spring 12 disengages the movable clamp handle 10 from the W-pin B when the tightener 24 relaxes the release-tension rope 21. The inside wheel seat 25 is provided with a pulley 23, and an advancing and retreating rope 22 is wound around the pulley 23 and has two ends connected to an advancing arm 19 and a retreating arm 20 respectively. The wheel seats 25 can be displaced along the insulating pole 26, so as to regulate tightness of the release-tension rope 21 and the advancing and retreating rope 22. A T-shaped three-arm pole 17 is hinged on the thread handle 28 with one half of "horizontal stroke of the character T" being the advancing arm 19 and the other half being the retreating arm 20 and "vertical stroke of the character T" being a shift fork 18 which comprises a U-shaped fork at its end to be in sliding fit with the clamp shaft 7, so as to shift the clamp shaft 7 to advance and retreat. Pulling a side of the advancing and retreating rope 22 which connects with the advancing arm 19 will enable shift fork 18 to shift the clamp 5 towards the socket A. Pulling a side of the advancing and retreating rope 22 which connects with the retreating arm 20 will enable the shift fork 18 to shift the clamp 5 away from the socket A. The insulating pole 26 is provided with a hanging ring 27 of which the position can be adjusted along an axial direction thereof and which is in hook connection with the inverted chain C by an insulating rope.

The working condition indicating lamps: The robot comprises four working condition indicating lamps, wherein the locating mechanism has two of them including one being the horizontally positioned lamp 31 which is installed on a bottom surface of the U-shaped socket clip 2 perpendicular to the ground and the other one being the vertically positioned lamp 3 which is installed at one side on an upper plane of the U-shaped socket clip 2 close to the clamp 5. The robot is in place in horizontal direction when the horizontally positioned lamp 31 is lightened and in place in vertical direction when the vertically positioned lamp 3 is lightened; at that time, the clamp 5 aligns with the W-pin B just right so as to conduct disassembly and assembly. The clamp 5 also has two working condition indicating lamps, one of which is a clamping position lamp 30 which is installed at one end of the sliding rail 29 close to the socket A where the clamp shaft 7 is located and the other one is a limiting lamp 14 which is installed at the end of the fixed clamp handle 15. The clamping position lamp is lightened to indicate when the clamp 5 is deepened into the socket A in place, and the limiting lamp 14 is lightened to indicate when the fixed jaw 6 and the movable jaw 16 clamp half of the W-pin B so as to shorten the pin tip opening space F of the W-pin B to be smaller than width G of a mouth of the socket A.

Each of the four working condition indicating lamps is formed as an intensified module by a battery 34, a signal light 33 and a switch 32.

When a W-pin B is disassembled, it is firstly to regulate space between the movable jaw 16 and the fixed jaw 6 by regulating the position regulating bolt 8 according to width used for clamping the W-pin B before getting on the tower, and then the robot is assembled appropriately in one set to regulate the clamp 5 and the three-arm pole 17 to operate flexibly and reliably. Operation preparation is conducted in accordance with live working procedures. The robot is hung for towering after getting on the tower. The insulating rope is tied to the insulating pole 26 and is tied to a lifting hook of the inverted chain C, and the inverted chain C is then hung over an iron tower member above such as a ground wire cross arm and the like. The positioning electrician controls the inverted chain C and lifts the insulating pole 26. The assembling and disassembling electrician holds the insulating pole 26 by his hands and moves left and right to advance and retreat, and cooperates with the positioning electrician to make the socket clip 2 clamp the socket A just right. When they see that the horizontally positioned lamp 31 and the vertically positioned lamp 3 are all lightened, it shows that the robot has been at a correct working position. The assembling and disassembling electrician pulls the advancing arm 19 and the clamp 5 is pushed into the socket A by the shift fork 18, so that the fixed jaw 6 and the movable jaw 16 are in the clamping situation. The tightener 24 is operated and the movable clamp handle 10 is pulled through the release-tension rope 21 so that the movable jaw 16 and the fixed jaw 6 clamp the W-pin B. Since the tightener 24 has a function of locking, the W-pin B will be clamped out of the socket A reliably. The clamp 5 clamping the W-pin B can retreat from the socket A when the retreating arm 20 is pulled. The insulating pole 26 is withdrawn, the tightener 24 is released, and the W-pin B is taken down to complete the disassembly of the pin.

When a W-pin B is assembled, the W-pin B is placed upright between the movable jaw 16 and the fixed jaw 6. The tightener 24 is tensioned and the movable clamp handle 10 is pulled to clamp the W-pin B. The insulating pole 26 is hung with the inverted chain C and the insulating rope. The positioning electrician and the assembling and disassembling electrician cooperate with each other to control the robot to work in place, which can be indicated by the lighting of the horizontally positioned lamp 31 and the vertically positioned lamp 3. The advancing arm 19 is pulled, the clamp 5 clamps the W-pin B to enter the socket A, and two pin tips of the W-pin B have stretched out of the mouth of the socket A when the clamping position lamp 30 is lightened. The tightener 24 is released, the W-pin B is expanded due to elastic force thereof and is clamped within the socket A by the two pin tips. The retreating arm 20 is pulled, the clamp 5 retreats from the socket A to withdraw the insulating pole 26, so that assembly of the pin is completed.

The live working robot for replacing the insulator string has the advantage that the insulator string can be replaced without the requirement of power cut, which guarantees electricity power utilized in social production and people's life. The live working robot is a purely mechanical robot which is in simple structure, works reliably and accurately and is time and labor saving.

DETAILED DESCRIPTION

Figure 1:
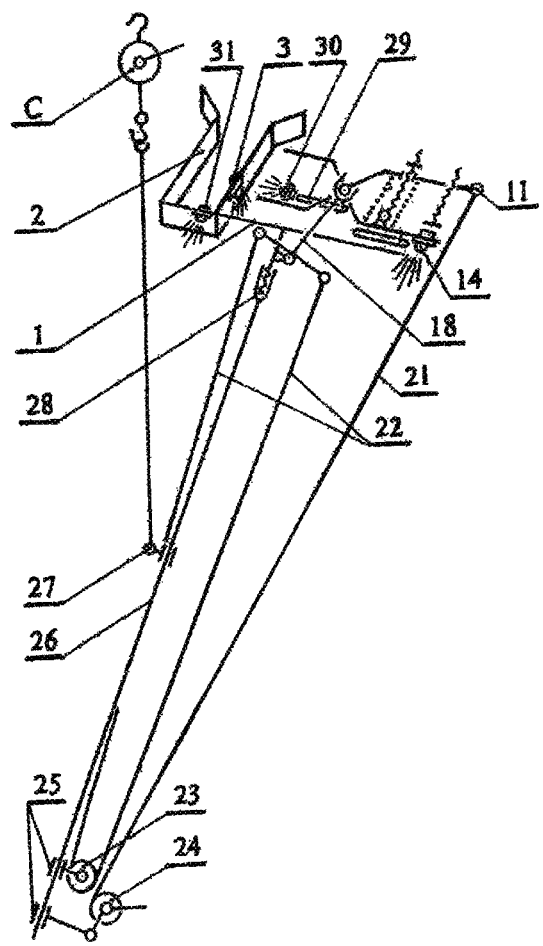
FIG. 1 is a view illustrating the structural principle of the live working robot for replacing the insulating string.
Figure 2:
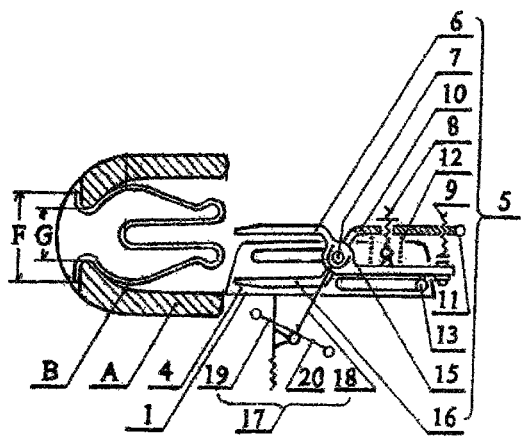
FIG. 2 is a view illustrating the structural principle of the clamp of the live working robot for replacing the insulating string.
Figure 3:
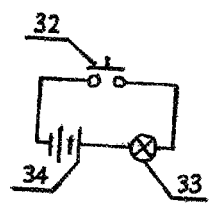
FIG. 3 is a circuit diagram of the working condition indicating lamps.

Specific to the size of a current W-pin B, the fixed jaw 6 and the movable jaw 16 are in isomorphic symmetry: length is 30 mm, tip thickness is 2 mm, root thickness is 5 mm; tip height is 7 mm and root height is 9 mm, both of which are close to a thickness of the W-pin B which is 8 mm; the clamp faces are provided with antiskid tooth. After the W-pin B is clamped, a gathering space formed by the fixed jaw 6 and the movable jaw 16 can accommodate half of the W-pin B. The movable clamp handle 10 has a root diameter of 9 mm, a tip diameter of 7 mm, and a length of 110 mm. The fixed clamp handle 15 has a root diameter of 9 mm, a tip diameter of 8 mm, and a length of 90 mm.

The tightener 24 uses a tightener for current electrical industry. The insulating pole 26 and its hung insulating rope use an article of utility for current electrical industry. The release-tension rope 21 and the advancing and retreating rope 22 use insulating ropes having diameters to be 8 mm. The pulley 23 uses an article of utility for current electrical industry.

What is claimed is:

1. A live working robot for replacing an insulator string, which is supported to operate in a horizontal plane by an insulating pole and is hung in a vertical plane to support operation by an insulating rope, in which a clamp is controlled to clamp a W-pin by a tightener through a release-tension rope and the clamp is controlled to advance and retreat by an advancing and retreating rope, characterized in that:
   a. the robot comprises four parts including a locating mechanism, a clamping mechanism, a transmission mechanism and working condition indicating lamps;
   b. a holder (1) is provided with a socket clip (2) at one end, a clamp (5) at the other end, a thread handle (28) and a clamping position lamp (30) at the middle, the thread handle (28) is connected to the insulating pole (26);
   c. a three-arm pole (17) is hinged on the thread handle (28);
   d. the insulating pole (26) is provided with a pulley (23), a tightener (24) and a hanging ring (27) via wheel seats (25);
   e. a shift fork (18) of the three-arm pole (17) is in sliding fit with a clamp shaft (7) of the clamp (5);
   f. one end of the advancing and retreating rope (22) is connected to an advancing arm (19) of the three-arm pole (17), and the other end is wound around the pulley (23) to be connected to a retreating arm (20); and
   g. the tightener (24) is connected to a rope ring (11) of the clamp (5) by an release-tension rope (21).

2. The live working robot for replacing the insulator string according to claim 1, characterized in that, the holder (1) comprises side plates (4) at both an upper and a lower sides thereof, and each of the two side plates (4) has two slide rails (29) parallel to each other.

3. The live working robot for replacing the insulator string according to claim 1, characterized in that, the socket clip (2) is in U shape with an opening end in a shape of a Chinese character "八", a bottom of the U shape is provided with a horizontally positioned lamp (31), and one side of the U shape is provided with a vertically positioned lamp (3).

4. The live working robot for replacing the insulator string according to claim 1, characterized in that, the clamp (5) comprises one half clamp body formed by a fixed jaw (6) and a fixed clamp handle (15) integrated into one piece and the other half clamp body formed by a movable jaw (16) and a movable clamp handle (10) integrated into one piece which are hinged by a clamp shaft (7); an end of the movable clamp handle (10) is provided with the rope ring (11); the middle part of the movable clamp handle (10) is formed with a hole through which a position regulating bolt (8) passes and a limit screw (9); an end of the fixed clamp handle (15) is provided with a handle shaft (13), the position regulating bolt (8) is hinged in the middle part of the fixed clamp handle (15); a limit pressure spring (12) is sleeved outside the position regulating bolt (8) between the fixed clamp handle (15) and the movable clamp handle (10); and the end of the fixed clamp handle (15) is provided with a limiting lamp (14).

5. The live working robot for replacing the insulator string according to claim 1, characterized in that, each of four working condition indicating lamps comprises a battery (34), a signal light (33) and a tact switch (32) which are connected in series.

* * * * *